3,347,842
STYRENE OXIDE-LIGNOSULFONATE PRODUCTS AND PROCESS OF MAKING SAME
Paul Melnychyn, Arcadia, Calif., assignor to Georgia-Pacific Corporation, Portland, Oreg., a corporation of Georgia
No Drawing. Filed Mar. 1, 1965, Ser. No. 436,291
18 Claims. (Cl. 260—124)

ABSTRACT OF THE DISCLOSURE

The process comprising reacting a sulfonated lignin-containing material with styrene oxide to reduce the phenolic hydroxyl content of the sulfonated lignin-containing material to an extent of at least about 5%.

---

This application is a continuation-in-part of my co-pending application Ser. No. 211,422, filed July 20, 1962, now abandoned.

This invention relates to novel products derived from lignosulfonates, and the processes of making these products. More particularly, it relates to reaction products employing styrene oxide.

Vast amounts of lignosulfonates are produced in making pulp from wood, the lignosulfonates representing the solubilized non-cellulosic portion of the wood, together with sugars and other soluble or solubilized wood components. The lignosulfonates so produced are somewhat suited for a variety of uses, but in general are not quite good enough for these uses to compete with other more expensive materials. Thus, for example, lignosulfonates have some tanning action, but in general are greatly inferior to natural tanstuffs. Again, lignosulfonates have some use as adhesives, but in their crude, unmodified state are unable to compete with other products of chemical industry except for the lowest grade uses in this field. Again, lignosulfonates have some dispersing and even surface active properties, but in their unmodified state have very limited usefulness here.

An object of the present invention is to produce novel products from lignosulfonates, whereby the utility of the latter is enhanced.

Another object of the invention is to provide processes for deriving useful products from lignosulfonates and styrene oxide.

Other objects of the invention will become apparent as the description thereof proceeds.

Generally speaking, and in accordance with an illustrative embodiment of the invention, I bring together a lignosulfonate and styrene oxide so as to form an admixture and maintain the admixture under conditions favorable to reaction, which in general is a condensation reaction of the lignosulfonate with the styrene oxide, and I maintain the admixture under the chosen conditions for a period of time long enough for the styrene oxide to react with the lignosulfonate. The resulting product is usable by itself for many purposes and, for other purposes, may be refined by known methods, such as dissolution followed by precipitation, fractional precipitation, desiccation and even heat-drying under vacuum, and the like.

The lignosulfonates are sulfonated lignin derivatives, lignin, of course, being the major constituent of wood besides cellulose. Sulfonated lignins are most generally obtained as a by-product in those processes of freeing the cellulose constituent of wood in which the lignin constituent is solubilized with a sulfite. The chief source of lignosulfonates is from the so-called sulfite waste liquor resulting from the sulfite pulping of wood in accordance with any of several processes, all of which have the common feature that a sulfite (or sulfur dioxide) is caused to react with the lignin in such a way that a water-soluble lignin sulfonate is formed. Lignosulfonates, sometimes referred to herein as "sulfonated lignin-containing materials," are most commonly produced as calcium salts, but are also obtainable in the form of their sodium, magnesium or ammonium salt, or mixtures of these. Other pulping processes, such as the neutral and alkaline pulping processes, in some cases produce a lignin which is not sulfonated as it is produced, but which may later be sulfonated to produce a lignosulfonate, which may be in the form of a calcium or sodium salt or the like. Lignosulfonates, indeed, form such a well-recognized chemical class that it is unnecessary to go into further details of their manufacture here.

In general, any type of wood or lignocellulosic material, these including straw, cornstalks, bagasse and the like, which can be resolved to pulp with the concomitant separation of the lignin-containing material, may be used as a source for providing lignosulfonate in following my invention. Furthermore, variations in the final properties of the product are influenced by the conditions of the pulping process, but particularly good results are obtained using the commercial spent sulfite liquor from paper grade quality pulp.

The degree of purity of the lignosulfonate, although not being a matter of limitation in regard to my invention, is a matter of importance in regard to the quality of the final product obtained by the process of my invention. For example, it is desirable, though not essential, to remove the free and loosely combined sulfur dioxide as well as other hydrolyzable compounds in the spent sulfite liquor, for example by steam stripping in accordance with the disclosure of United States Letters Patent No. 2,430,455 to Joseph L. McCarthy. Good results are also obtained by mild alkaline treatment, for example, at pH 7 to 10 at a temperature commensurate with the time. The spent sulfite liquor may be further refined to provide a purified lignosulfonate starting material by the use of such methods as fermentation with either yeast or bacteria, dialysis, or fractionation by treatment with lime, as in the Howard process, or by separation with organic solvents.

Another method of purifying the lignosulfonate for the inventive purposes is to replace the calcium ions in calcium-base spent sulfite liquor especially after fermenting out the sugars and stripping with steam, by treatment with such calcium-precipitating acids as oxalic and sulfuric, followed, if desired, by treatment with a cation exchange resin in the acid form, so as to produce a purified lignosulfonic acid solution in water. This is then treated with an organic base, especially one having long enough hydrocarbon radicals to be hydrophobic in the free-base form, so as to precipitate out an organic onium (or like base) lignosulfonate, which may be removed from the solution and washed. The lignosulfonate is then regenerated in a purified, water-soluble form by subsequent treatment with an alkali such as calcium hydroxide or sodium hydroxide, which solubilizes the lignosulfonate moiety and at the same time insolubilizes the organic base.

It should be emphasized that it is not essential to the practice of my invention to purify the lignosulfonate to any great extent, or, indeed, to any extent at all. However, sugars and like materials normally present in crude lignosulfonates may react with styrene oxide so that when these non-lignosulfonate contaminants are present the consumption of styrene oxide is correspondingly increased. A reasonable degree of purification or "cleaning up" the lignosulfonate is therefore almost always justified on economic grounds. Extreme purification is very useful for investigating and preparing the purest compounds of my invention, but the cost of the final product is naturally considerably increased.

Styrene oxide is an aromatic epoxy compound which is liquid between the temperatures of about −36.6° C. and 194° C. It may also be named as phenylethylene oxide, or, alternatively, epoxyethylbenzene. It is commercially available in quantity.

Generally speaking, the lignosulfonate or lignosulfonate-containing material is admixed with styrene oxide in weight proportions within the range of one part of lignosulfonate to one-thirtieth part of styrene oxide, to one part of the former to three parts of the latter. That is, the range is within the ratios 1:1/30 and 1:3. This is based on the content of lignosulfonate in simple salt form, such as sodium lignosulfonate or calcium lignosulfonate. Of course, if the lignosulfonate chosen is diluted with another constituent which likewise may react with styrene oxide, for example with wood sugars, then a proper allowance must be made for the styrene oxide consumed by the non-lignosulfonate constituent. The lower weight ratio, viz. 1:1/30, represents about the lowest ratio at which I find appreciable enhancement of the properties of the treated lignosulfonate for various uses. The upper weight range, viz. 1:3, represents the approximate limit beyond which further added styrene oxide, which is already in excess of the amount required to react with the available reactive groups on the lignosulfonate, will merely be left over in the resulting produce as a diluent.

The reaction leading to the novel products of the invention may be carried out under a variety of conditions. Thus, this reaction may be performed under acid, alkaline or neutral conditions. For example, I have found that it is quite satisfactory to have the lignosulfonate in the form of a water-soluble salt, commonly of calcium or sodium; to render the solution alkaline, for example, but not by way of limitation, to within a pH range of between 8 and 12, by means of a suitable alkali, which may be inorganic, such as the oxides, hydroxides and carbonates of the alkali metals, and the oxides and hydroxides of the alkaline earth metals, or organic, such as the quaternary nitrogen bases and tertiary alkyl, aryl or cyclic amines such as trimethylamine, triamylamine, pyridine and dimethyl aniline; to add the styrene oxide; and to heat, most conveniently at a temperature within the range of 50° C. to 100° C., for a period of time sufficient to bring about the reaction of the constituents. This time will naturally depend upon concentration, pH, and temperature, but will, in general, be found to be within the range of 5 to 24 hours.

For some purposes the entire reaction mixture, including the water, may be used. An example is the use of the product as a dispersing agent in systems which are normally alkaline, such as suspensions of certain colloidal clays. For other purposes it is convenient to acidify the reaction mixture, for example, to a pH of 1.0 with the use of a mineral acid, recovering the precipitate, washing, and realkalizing to any pH desired, which may be, for example, 7.

A working example will now be given, in which, for the sake of simplicity, the lignosulfonate material is first purified rather carefully:

EXAMPLE I 1.5 liters of liquor, from the calcium sulfite pulping of hemlock wood chips, which had been steam stripped to remove sulfur dioxide, hydrolyzable sulfur compounds, and volatile organic compounds, subsequently fermented with brewer's yeast, steam stripped to remove the alcohol and evaporated to a viscous liquid containing 50% solids, were heated to about 70° C. and 100 grams of concentrated sulfuric acid were added thereto. Calcium sulfate precipitated and was removed by centrifuging. The resulting supernatant liquid was mixed with small portions of a 3:1 (v:v ratio) triamylamine-ether solution, until most of the brown color disappeared from the aqueous phase. At the same time, a gummy precipitate formed. The precipitate was separated from the aqueous phase, dissolved in a mixture of acetone-water (approximately 1:1) and reprecipitated by adding an excess of water. The precipitate was filtered and dried, and then redissolved in the acetone-water mixture and alkalized to about pH 9 by adding sodium hydroxide. This treatment liberated the triamylamine, which was removed from the solution by shaking repeatedly with trichloroethylene, which dissolved the triamylamine and removed it from the aqueous solution. The resulting aqueous solution was concentrated somewhat by evaporation of water, and then passed through a column of cation-exchange resin in the acid form. This produced a solution of lignosulfonic acid, which was then adjusted to pH by using sodium hydroxide.

A solution of the sodium lignosulfonate derived as just described, containing 100 grams of sodium lignosulfonate and 200 cc. of water, was then further alkalized to a pH of 8.1 with sodium hydroxide, placed in a three-necked flask fitted with a stirrer, reflux condenser and thermometer, 200 cc. of styrene oxide were added, and the flask and contents were heated to 90–95° C. for 5.6 hours. The mixture was then allowed to cool, and an approximately equal volume of acetone was added, whereupon two layers formed, of which the top layer was decanted and discarded. The lower layer was repeatedly washed with fresh acetone, about five times in all, until the product contained therein became granular. This granular product was found to be soluble in methanol, and was found to be a highly effective dispersant for kaolin in water.

EXAMPLE II

Purified calcium lignosulfonate was prepared by the method described in the first paragraph of Example I above, except that calcium hydroxide was used in place of sodium hydroxide in the final alkalizing step. Twenty-five grams of this calcium lignosulfonate were dissolved in 100 cc. of 1% sodium hydroxide solution and 20 cc. of styrene oxide were then added. The mixture, in a flask as in Example I, was heated at 55–60° C. for three hours. Thereupon, 20 cc. additional styrene oxide were added and the mixture refluxed at 90–95° C. for 5 hours. The mixture was cooled, extracted with ether, the ether being discarded, the precipitate present in the flask was removed, washed with water, and dried. This precipitate was not soluble in ethanol, methanol, acetone, benzene, toluene, ethyl ether, petroleum ether, butyl cellosolve, or dioxane, and was moreover insoluble in hot 6 N hydrochloric acid and hot 25% sodium hydroxide. It was found to be soluble, however, in N,N-dimethylformamide, phenol, and formic acid.

An additional portion of product was recovered from the supernatant aqueous liquid in the flask, after removal of the precipitate therefrom. This liquid was passed through a column of cation-exchange resin in the acid form, thereafter adjusted to pH 4 with sodium hydroxide, and dried. The resulting material was found to be soluble in methanol.

EXAMPLE III 50 grams of lignosulfonate prepared as described in Example I hereinabove were dissolved in 100 cc. water and alkalized to pH 10.0 with sodium hydroxide. 100 cc. of styrene oxide were added to the solution and the mixture heated with continuous stirring at 90–96° C. for 5 hours. 25 cc. additional styrene oxide were added and heating continued for a further 1½ hours. The mixture was allowed to cool and to stand overnight. The next day, the solution was alkalized with sodium hydroxide to a pH of 12 and allowed to stand at room temperature for an additional 8 hours. The mixture was then acidified with hydrochloric acid to a pH of 1 and then thrice extracted with ether. This caused a separation of a gummy product which was not soluble in ether or water, but which was intermediate in density between the ether and the water layers. This product was removed and dissolved in acetone to which sufficient water was added to bring about solubility. The product was then precipitated out of the acetone-water solution with ether, recovered, dissolved in methanol, and reprecipitated with ether. This methanol-solution, ether-precipitating cycle was repeated three times. The product was finally extracted for 26 hours with ether in a Soxhlet apparatus and dried from petroleum ether. The product was light gray in color, soluble in methanol, resistant to solution in water at room temperature, but soluble in warm water.

EXAMPLE IV 50 grams of a sulfonated kraft lignin were dissolved in 100 cc. of water and made alkaline to a pH of 10 with sodium hydroxide. To this solution there was added 50 cc. of styrene oxide, and the mixture was heated with continuous stirring at 90–100° C. for 6 hours. After 2 hours and again after 4 hours 25 cc. of styrene oxide was added, resulting in a total addition of styrene oxide of 100 cc. The solution was then allowed to cool, the pH was raised at 12 with sodium hydroxide, and the mixture was allowed to stand overnight. It was acidified with hydrochloric acid to a pH of 4, and extracted repeatedly with ether. The extracted product was then dissolved in an acetone-water mixture, precipitated with ether, washed with petroleum ether, and dried. The product was a brown powder, soluble in warm water.

To demonstrate the superior dispersing and deflocculating action of the lignosulfonate of my invention, tests were performed in which the compound of Example III was compared with the lignosulfonate from which it was prepared as the dispersing or deflocculating ingredient of a wettable insecticidal powder formula.

In this test, 75 grams of dieldrin and 20 grams kaolin were finely ground together to make an insecticidal powder. For each test, 0.475 gram of this mixture was dispersed, by stirring for one minute, in 25 milliliters of water containing 0.025 gram of the dispersant to be tested and 0.005 gram of sodium N-methyl N-oleoyl taurate as a wetting agent. Each dispersion thus made was put in a one-liter graduated cylinder and distilled water was added to make one liter.

At the end of two hours, the following observations of the state of the dispersions were made:

(1) In the cylinder containing styrene oxide compound of my invention: Solids still substantially well dispersed. Considered a good dispersion. No perceptible density gradient from top to bottom.

(2) In the cylinder containing sodium lignosulfonate from which the styrene oxide compound was made: A high degree of settling was evident. Considered an unsatisfactory dispersion.

In order to demonstate that the compound of my invention is superior as an emulsifying agent to the lignosulfonate from which it was made, tests were performed in which the product of Example III was tested as an emulsifying agent for oil in water.

Emulsions were prepared by shaking 12 milliliters of diesel oil with 28 milliliters of 1% aqueous solutions of emulsifying agent in glass-stoppered bottles of 60 milliliter capacity in a shaking machine for 2 minutes. After shaking, the emulsions were poured into 50 milliliter graduated cylinders for observation.

*Results of observations*

Millilters of free oil separated after 50 minutes
Sodium lignosulfonate _____ 3
Styrene oxide-lignosulfonate _____ 1

It is clear from the above results that the styrene oxide lignosulfonate compound of my invention is a superior emulsifying agent.

EXAMPLE V

A spent sulfite liquor obtained from the pulping of softwoods by a calcium bisulfite pulping process was purified by amine purification to obtain a substantially purified calcium lignosulfonate. Twenty grams of the calcium lignosulfonate obtained was dissolved in 80 grams of water, and sulfuric acid was added to the solution until a pH of 2.9 was obtained. The resulting product was then centrifuged to remove the precipitated calcium sulfate. The clear solution of lignosulfonic acid thus obtained at a pH of 2.9 was heated under reflux and 20 grams of styrene oxide were added over a period of 65 minutes. The product was then boiled under reflux for an additional 3 hours after the completion of the addition of styrene oxide.

The reaction mixture was poured into acetone to separate the lignosulfonate-styrene oxide product by precipitation. The precipitate obtained was washed with acetone, extracted in a Soxhlet extractor with petroleum ether, and dried. The final product, weight 18.4 grams, was evaluated as a dispersing and emulsifying agent in comparison to the purified calcium lignosulfonate used for the preparation of the lignosulfonate-styrene oxide product.

To illustrate the improved dispersing properties of the product, a test was made using the additive as a dispersant for an insecticide. A powder was made by grinding technical Dieldrin and Kaolin in the proportions of 79% Dieldrin in a Waring Blendor until all of the material passed through a 100 mesh sieve. This powder base was then used to make up preparations for testing as follows:

G.
(1) Dieldrin-Kaolin powder _____ 0.4750
    Igepon T-77 _____ 0.0075
(2) Dieldrin-Kaolin powder _____ 0.4750
    Igepon T-77 _____ 0.0075
    Purified calcium lignosulfonate _____ 0.0250
(3) Dieldrin-Kaolin powder _____ 0.4750
    Igepon T-77 _____ 0.0075
    Lignosulfonate-styrene oxide product ____ 0.0250

Igepon T-77 surfactant is a techincal sodium salt of N-methyl N-oleoyl tauride and was used as a wetting agent in this formulation.

Each of these three mixtures was dispersed in 100 ml. of water by stirring for 2 minutes with a magnetic stirrer and then diluted to 1000 ml. in a 1000 ml. graduated cylinder.

After the three suspensions had stood for 2 hours, a clear top layer of about 0.5% of the total volume was observed in the suspensions made with the product to which a calcium lignosulfonate was added, whereas no clear top layer could be detected in the suspension made with the lignosulfonate-styrene oxide product. After standing overnight, all three suspensions showed a clear top layer of about 0.5% of the total volume but the suspension made with the lignosulfonate-styrene oxide product was much more turbid in bulk than the suspensions made with no lignosulfonate and with calcium lignosulfonate, indicating that the lignosulfonate-styrene oxide product is superior to the calcium lignosulfonate as a deflocculant for the insecticide powder.

To illustrate the improved emulsifying properties of the lignosulfonate-styrene oxide product, three oil-in-water emulsions were prepared by shaking 12 ml. of diesel oil and 28 ml. of water in a 60 ml. glass-stoppered bottle in a paint-shaker for exactly 2 minutes. The mixtures were immediately poured into 50 ml. graduated cylinders for observations.

One of the mixtures contained no emulsifying agent, the aqueous phase being only water. In the other two, the aqueous phases were a 1% solution of purified calcium lignosulfonate and a 1% solution of lignosulfonate-styrene oxide product.

The emulsion made without an emulsifying agent broke very rapidly and had separated almost completely by the time it was transferred to the graduated cylinder.

The separation of the other two emulsions was observed, with the results shown below.

| Elapsed Time, Min. | Volume of Clear Aqueous Phase on Bottom, Percent of Total Volume | |
|---|---|---|
| | Calcium Lignosulfonate | Lignosulfonate-Styrene Oxide Product |
| 5 | 8 | 5 |
| 10 | 16 | 8 |
| 15 | 20 | 11 |
| 20 | 37 | 16 |
| 25 | 45 | 17 |

Styrene oxide derivatives of lignosulfonates are less soluble in water and more soluble in methanol than the corresponding unreacted lignosulfonates. This change in solubility is brought about by the reaction between the lignosulfonate molecules and styrene oxide.

I have found that the reaction in accordance with the invention with styrene oxide also affects the reducing content of lignosulfonate. The reducing content determination is a standard procedure, employing Fehling's solution to measure the amount of reducing substance present capable of reducing the copper ion in the Fehling's solution to cuprous oxide. The results are expressed in terms of percent glucose. By this procedure a refined lignosulfonate contains reducing substances equivalent to 2 to 3 percent of glucose.

The reaction with styrene oxide lowers the reducing substance content of the lignosulfonate almost to zero value, as shown in the analytical results tabulated below for the styrene oxide derivatives.

A further analytical characteristic which is an indication of the reaction of the lignosulfonate with styrene oxide is the phenolic hydroxyl content. A decrease in the phenolic hydroxyl content of at least 5% of the total will give a product of improved properties. Generally, it is preferred to have sufficient reaction take place to decrease the phenolic hydroxyl by at least 30% and even to react to the extent that the phenolic hydroxyl has decreased to substantially zero. This is conveniently determined by the method described by O. Goldschmid (Anal. Chem. 26: 1421 (1954)). The method depends on the difference in the absorption of ultraviolet light by a solution of the product at neutral and at alkaline pH. The phenolic hydroxyl contents of the styrene oxide derivatives, as determined by Goldschmid's method, are presented in the following table together with analytical data for the content of the reducing sugars.

| Sample | Reducing Sugars, Percent | Phenolic Hydroxyl, Percent |
|---|---|---|
| Unreacted sodium lignosulfonate of Example I | 3.7 | 1.8 |
| Unreacted calcium lignosulfonate of Example II | 2.5 | 1.2 |
| Unreacted sulfonated Kraft lignin of Example IV | 3.7 | 2.05 |
| Styrene oxide treated calcium lignosulfonate of Example II | 0.2 | 0.0 |
| Styrene oxide treated sodium lignosulfonate of Example I | 0.8 | 0.3 |
| Styrene oxide treated sodium lignosulfonate of Example III | 0.4 | 0.1 |
| Styrene oxide treated sulfonated Kraft lignin of Example IV | 0.2 | 0.0 |

While the invention has been described with the aid of specific examples, it will be understood that the invention is a broad one, and that many variations are permissible within the broad scope of the invention as defined by the claims which follow.

I claim:
1. The process of modifying a sulfonated lignin-containing material which comprises admixing the sulfonated lignin-containing material with styrene oxide and maintaining said admixture for a period of time long enough to permit reaction of said styrene oxide with said sulfonated lignin-containing material to an extent sufficient to reduce the phenolic hydroxyl content thereof to an extent of at least about 5%.

2. The process of claim 1 wherein the sulfonated lignin-containing material is obtained from spent sulfite liquor.

3. The process of claim 1 wherein the phenolic hydroxyl content is reduced at least about 30%.

4. The process of modifying a lignosulfonate chosen from the class consisting of hydrogen, alkali metal, and alkaline earth metal lignosulfonates, and mixtures thereof, which comprises admixing the lignosulfonate with styrene oxide and maintaining said admixture for a period of time long enough to permit reaction of said styrene oxide with said lignosulfonate to an extent sufficient to reduce the phenolic hydroxyl content thereof to an extent of at least about 5%.

5. The process of modifying a lignosulfonate chosen from the class consisting of hydrogen, alkali metal, and alkaline earth metal lignosulfonates, and mixtures thereof, which comprises freeing the lignosulfonate from non-lignosulfonate congeners, admixing the lignosulfonate with from about 1/30 to about 3 times its weight of styrene oxide and maintaining said admixture for a period of time long enough to permit reaction of said styrene oxide with said lignosulfonate to an extent sufficient to reduce the phenolic hydroxyl content thereof to an extent of at least about 5%.

6. The process of modifyng a sulfonated lignin-containing material comprising freeing the sulfonated lignin-containing material from non-lignosulfonate congeners, admixing the sulfonated lignin-containing material with water and alkalizing with a basic reagent to a pH within the range of about 8 to about 12, adding styrene oxide and maintaining said admixture for a period of time long enough to permit reaction of said styrene oxide with said sulfonated lignin-containing material to an extent sufficient to reduce the phenolic hydroxyl content thereof to an extent of at least about 5%.

7. The process of claim 6 wherein the sulfonated lignin-containing material is obtained from spent sulfite liquor.

8. The process of modifying a lignosulfonate chosen from the class consisting of hydrogen, alkali metal, and alkaline earth metal lignosulfonates, and mixtures thereof, which comprises freeing the lignosulfonate from non-lignosulfonate congeners, admixing the lignosulfonate with water and alkalizing with sodium hydroxide to a pH within the range of about 8 to about 12, adding from about 1/30 to about 3 times its weight of styrene oxide and maintaining the mixture thus formed for a period of time long enough to permit reaction of the styrene oxide with said lignosulfonate to an extent sufficient to reduce the phenolic hydroxyl content thereof to an extent of at least about 5%.

9. The process of modifying a sulfonated lignin-containing material which comprises admixing the sulfonated lignin-containing material with styrene oxide and maintaining said admixture at a temperture within the range of from about 50° C. to about 100° C. for a period of time long enough to permit reaction of said styrene oxide with said sulfonated lignin-containing material to an extent sufficient to reduce the phenolic hydroxyl content thereof to an extent of at least about 5%.

10. The process of claim 9 wherein the sulfonated lignin-containing material is obtained from spent sulfite liquor.

11. The process of modifyng a lignosulfonate chosen from the class consisting of hydrogen, alkali metal, and alkaline earth metal lignosulfonates, and mixtures thereof, which comprises admixing the lignosulfonate with styrene oxide and maintaining said admixture at a temperature within the range of from about 50° C. to about 100° C. for a period of time long enough to permit reaction of said styrene oxide with said lignosulfonate to an extent sufficient to reduce the phenolic hydroxyl content thereof to an extent of at least about 5%.

12. The process of modifying a lignosulfonate chosen from the class consisting of hydrogen, alkali metal, and alkaline earth metal lignosulfonates, and mixtures thereof, which comprises freeing the lignosulfonate from non-lignosulfonate congeners, admixing the lignosulfonate with from about $1/30$ to about 3 times its weight of styrene oxide and maintaining said admixture at a temperature within the range of from about 50° C. to about 100° C. for a period of time long enough to permit reaction of said styrene oxide with said lignosulfonate to an extent sufficient to reduce the phenolic hydroxyl content thereof to an extent of at least about 5%.

13. The process of modifying a sulfonated lignin-containing material comprising freeing the sulfonated lignin-containing material from non-lignosulfonate congeners, admixing the sulfonated lignin-containing material with water and alkalizing with a basic reagent to a pH within the range of about 8 to about 12, adding styrene oxide and maintaining said admixture at a temperature within the range of from about 50° C. to about 100° C. for a period of time long enough to permit reaction of said styrene oxide with said sulfonated lignin-containing material to an extent sufficient to reduce the phenolic hydroxyl content thereof to an extent of at least about 5%.

14. The process of claim 13 wherein the sulfonated lignin-containing material is obtained from spent sulfite liquor.

15. The process of modifying a lignosulfonate chosen from the class consisting of hydrogen, alkali metal, and alkaline earth metal lignosulfonates, and mixtures thereof, which comprises freeing the lignosulfonate from non-lignosulfonate congeners, admixing the lignosulfonate with water and alkalizing with sodium hydroxide to a pH within the range of about 8 to about 12, adding from about $1/30$ to about 3 times its weight of styrene oxide and maintaining the mixture thus formed at a temperature within the range of from about 50° C. to about 100° C. for a period of time long enough to permit reaction of the styrene oxide with said lignosulfonate to an extent sufficient to reduce the phenolic hydroxyl content thereof to an extent of at least about 5%.

16. The product resulting from the process of claim 1.
17. The product resulting from the process of claim 4.
18. The product resulting from the process of claim 6.

References Cited

Brauns, Chem. of Lignin (1952) p. 303.

CHARLES B. PARKER, *Primary Examiner.*

D. R. PHILLIPS, *Assistant Examiner.*